T. WEBB.
SAW STRAIGHTENING ANVIL.
APPLICATION FILED JAN. 29, 1919.
1,317,902.
Patented Oct. 7, 1919.
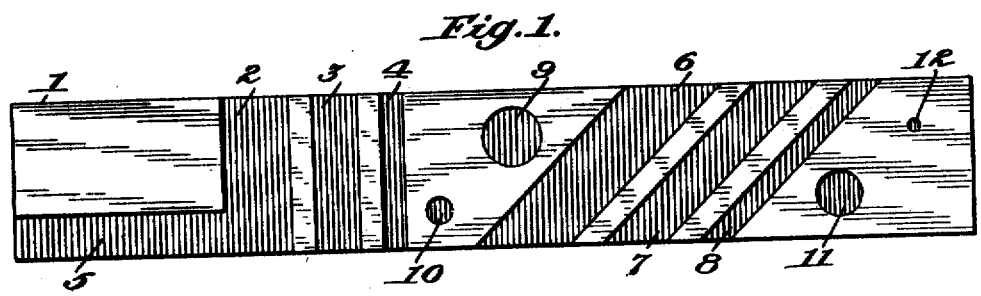
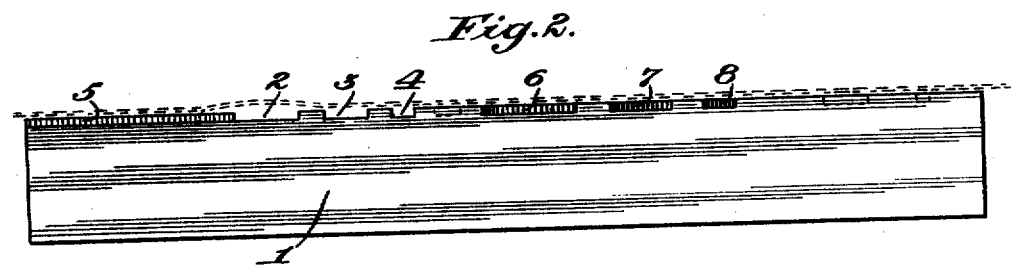
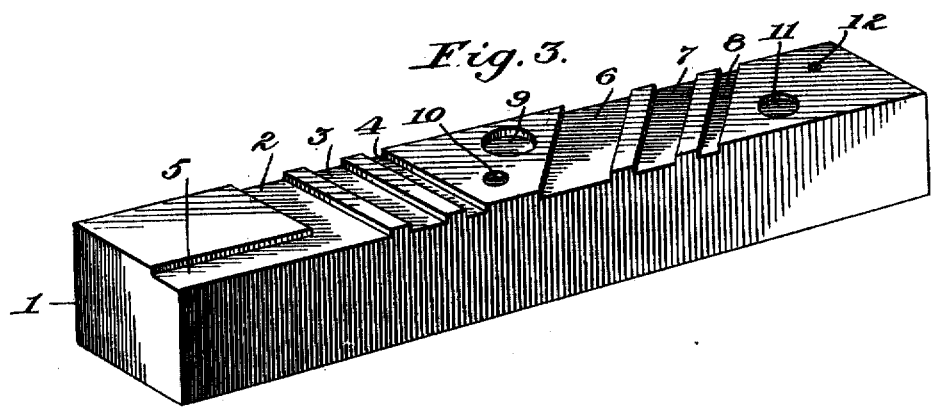
Inventor:
Thomas Webb.
Att'ys.

UNITED STATES PATENT OFFICE.

THOMAS WEBB, OF VANCOUVER, BRITISH COLUMBIA, CANADA.

SAW-STRAIGHTENING ANVIL.

1,317,902.   Specification of Letters Patent.   Patented Oct. 7, 1919.

Application filed January 29, 1919. Serial No. 273,783.

*To all whom it may concern:*

Be it known that I, THOMAS WEBB, a subject of the King of Great Britain, and a resident of Vancouver, in the Province of British Columbia and Dominion of Canada, have invented certain new and useful Improvements in Saw-Straightening Anvils, of which the following is a specification.

My invention is an improvement in saw straightening anvils, and has for its object to provide a device of the character specified, adapted for use in straightening the cutting and raking teeth of saws, for facilitating the removal of dents and bumps from the saw and for straightening twists in the blade.

In the drawings:

Figure 1 is a top plan view of the improved anvil;

Fig. 2 is a side view; and

Fig. 3 is a perspective view.

In the present embodiment of the invention the improved anvil comprises a block 1 of suitable material as, for instance, steel, of suitable dimensions, and the said block is substantially rectangular in cross section.

The block or anvil has two faces of equal area and of greater area than the other faces, and one of these faces is a base upon which the anvil rests. The other face has near one end a series of transverse notches 2, 3 and 4, extending the full width of the block and of the same depth, and the grooves are of different widths. For instance, the groove 2 is three inches in width, the groove 3 is two inches in width and the groove 4 is one inch in width.

A rabbet 5 leads from one end of the groove to the adjacent end of the block, the said rabbet being of the same depth as the groove and extending from the groove through to the end of the block. Intermediate the groove 4 and the opposite end of the block is provided a series of diagonal grooves 6, 7 and 8, the said grooves being of the same width as the grooves 2, 3 and 4, respectively.

These grooves 6, 7 and 8 are inclined at angles of approximately forty-five degrees to the long axis of the block, and a space is left between the grooves 4 and 6 at one end of the series and between the groove 8 and the adjacent end of the block at the other end.

Recesses or depressions 9 and 10 are provided in the first named space, and other recesses 11 and 12 are provided in the last named space. The recesses 9, 10, 11 and 12 are circular and are of approximately the same depth as that of the grooves 2, 3, 4, 6, 7 and 8. The recess 9 is, in practice, two and a half inches in diameter, the recess 11 which is next in size two inches in diameter, while the recesses 10 and 12 are one inch and one-half inch in diameter, respectively.

In use, the improved anvil is laid upon a suitable support, as, for instance, a bench or table, and if the cutting teeth or raker teeth of a cross cut saw are to be straightened, the saw is laid upon the top of the anvil in such manner that the teeth of the saw will project beyond that shoulder which separates the rabbet 5 from the face of the block. The teeth may now be straightened, and it will be obvious that the teeth of any kind of a saw, as, for instance, a hand saw or a band saw, may be straightened in the same manner.

In order to straighten dents or bumps, the saw is laid upon the anvil and the dents or bumps are brought into register with that recess 9, 10, 11 or 12 best suited for the purpose. Here, by the application of a hammer or other instrument of percussion, the bumps or dents may be removed. In order to straighten twists, the grooves 6, 7 and 8 are used, while square bends or kinks in the blade are straightened at the grooves 2, 3 and 4.

The surface between the groove 2 and the rabbet 5 provides a smooth anvil for any desired purpose.

I claim:

1. An anvil of the character specified, comprising a block of substantially rectangular cross section, said block having upon its upper face a series of transverse grooves, a series of diagonal grooves, a series of depressions, said grooves and depressions being of varying size, the transverse grooves being near one end of the block, and the block being rabbeted from one end of the block to the adjacent end of the adjacent groove.

2. An anvil of the character specified, comprising a block of substantially rectangular cross section, said block having upon its upper face a series of transverse grooves, a series of diagonal grooves, a series of depressions, said grooves and depressions being of varying size.

3. An anvil of the character specified, comprising a block of substantially rectangular cross section, said block having upon its upper face a series of transverse grooves, and a series of diagonal grooves.

4. An anvil of the character specified, comprising a block of substantially rectangular cross section, said block having upon its upper face a series of transverse grooves for the purpose specified.

5. An anvil of the character specified having in its upper face a series of transverse grooves, and a series of diagonal grooves, the grooves of each series being of unequal diameter.

6. An anvil of the character specified having in its upper face a series of depressions of unequal diameter for the purpose specified.

7. An anvil of the character specified comprising a block having in its upper face a series of transverse grooves and a rabbet leading from the endmost groove at one side of the said upper face of the block to the adjacent end of the block.

THOMAS WEBB.

Witnesses:
J. H. HOUSTEN,
A. M. MCTAVISH.